US012492677B1

(12) United States Patent
Rakshit et al.

(10) Patent No.: US 12,492,677 B1
(45) Date of Patent: Dec. 9, 2025

(54) ENERGY GENERATION CONTROLLER FOR WIND TURBINE WITH SHADOW-EFFECT ENERGY GENERATOR(S)

(71) Applicant: INTERNATIONAL BUSINESS MACHINES CORPORATION, Armonk, NY (US)

(72) Inventors: Sarbajit Kumar Rakshit, Kolkata (IN); Jagabondhu Hazra, Bangalore (IN); Manikandan Padmanaban, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/007,663

(22) Filed: Jan. 2, 2025

(51) Int. Cl.
F03D 7/02 (2006.01)
F03D 1/06 (2006.01)
(Continued)

(52) U.S. Cl.
CPC ............ *F03D 7/022* (2013.01); *F03D 1/0633* (2013.01); *F03D 9/25* (2016.05); *H02P 9/04* (2013.01);
(Continued)

(58) Field of Classification Search
CPC .......... F03D 7/022; F03D 9/25; F03D 1/0633; H02P 9/04; H02P 2101/15; F05B 2260/70;
(Continued)

(56) References Cited

U.S. PATENT DOCUMENTS 8,330,296 B2 12/2012 Ottman
9,599,299 B2 3/2017 Hoang
(Continued)

FOREIGN PATENT DOCUMENTS

CN 112761896 A 5/2021
IN 201641011197 A 1/2017
(Continued)

OTHER PUBLICATIONS

"Micro turbine array usage in multiple applications", An IP.com Prior Art Database Technical Disclosure, Authors et al.: Disclosed Anonymously, IP.com No. IPCOM000205353D, IP.com Electronic Publication Date: Mar. 28, 2011, Abstract Only.
(Continued)

*Primary Examiner* — Sean Gugger
(74) *Attorney, Agent, or Firm* — Michael A. Petrocelli, Esq.; Kevin P. Radigan, Esq.; Heslin Rothenberg Farley & Mesiti P.C.

(57) ABSTRACT

An energy generation control process is provided for a wind turbine with shadow-effect energy generator(s). The control process includes determining, by an energy generation controller, an adjustment to a blade angle of a wind turbine to increase cumulative energy generation over a forecast time interval from the wind turbine. The wind turbine generates wind-based energy, and the wind turbine includes one or more shadow-effect energy generators to generate shadow-effect energy. The cumulative energy generation includes any wind-based energy generation and shadow-effect energy generation over the forecast time interval. The control process further includes initiating, by the energy generation controller, dynamically adjusting of the blade angle of the wind turbine using the determined adjustment to the blade angle to increase the cumulative energy generation over the forecast time interval from the wind turbine and the one or more shadow-effect energy generators.

20 Claims, 9 Drawing Sheets

(51) Int. Cl.
*F03D 9/25* (2016.01)
*H02P 9/04* (2006.01)
*H02P 101/15* (2016.01)

(52) U.S. Cl.
CPC ....... *F05B 2260/70* (2013.01); *F05B 2260/84* (2013.01); *F05B 2270/20* (2013.01); *F05B 2270/32* (2013.01); *F05B 2270/321* (2013.01); *H02P 2101/15* (2015.01)

(58) Field of Classification Search
CPC .............. F05B 2260/84; F05B 2270/20; F05B 2270/32; F05B 2270/321
See application file for complete search history.

(56) References Cited

U.S. PATENT DOCUMENTS

| | | | |
|---|---|---|---|
| 2011/0089698 | A1 | 4/2011 | Ahmadi |
| 2013/0045098 | A1* | 2/2013 | Taylor ..................... F03D 7/024 416/1 |
| 2014/0322013 | A1 | 10/2014 | Elkin et al. |
| 2018/0340515 | A1 | 11/2018 | Huyn et al. |
| 2024/0192660 | A1* | 6/2024 | Rakshit ............... G05B 19/4155 |
| 2025/0038571 | A1* | 1/2025 | Rakshit ................. H02J 50/001 |

FOREIGN PATENT DOCUMENTS

| | | |
|---|---|---|
| JP | 7131871 B1 | 9/2022 |
| KR | 10-1124172 B1 | 3/2012 |
| WO | 2012/076839 A2 | 6/2012 |

OTHER PUBLICATIONS

Authors et al.: Disclosed Without Attribution, IP.com No. IPCOM000267538D, "Method and System for Dynamic Shape Change of a Robot to Harvest Power from a Shadow", Nov. 2, 2021, 4 pages.

Labib et al. "Blade-Angle Effect on Overall Performance of Archimedes Wind Turbines", Proceedings of ICFD14: Fourteenth International Conference of Fluid Dynamics, Apr. 2-3, 2021, 9 pages.

Zhang et al. "Energy Harvesting from Shadow-effect", Energy & Environmental Science, Royal Society of Chemistry, Apr. 15, 2020, 31 pages.

* cited by examiner $$J = Max. \sum_{j=1}^{N} \{w_G \cdot E_G(\alpha_j^*, \vec{M}_j) + w_L \cdot E_L(\alpha_j^*, C_j^*)) - \sum_{i=1}^{N} w_{uP_i}(\alpha_j - \alpha_j^*)^2\}\}$$

ENERGY GENERATED BY THE WIND BLADE(S)

ENERGY GENERATED BY SEG EMBEDDED IN WIND BLADE(S)

COST FOR CHANGE IN BLADE ANGLE subject to $\quad \vec{M}^{min} \leq \vec{M}_j \leq \vec{M}^{max}; \quad \alpha^{min} \leq \alpha_j \leq \alpha^{max};$ $J$ - cost function (total energy gain)
$\alpha_j^*$ - optimal spiral wind blade angle for the forecasted time instant 'j'
$\vec{M}_j$ - blade tip speed for the forecasted time instant 'j'
$E_G$ - Energy generated by the wind blade, which is a function of blade angle '$\alpha_j^*$' and blade tip speed '$\vec{M}_j$'
$E_L$ - Energy generated by SEG embedded in the wind blade, which is a function of blade angle '$\alpha_j^*$' and contrast ratio '$C_j^*$'
$w_G, w_L$ - weighing coefficient for an energy generated from wind blade and embedded SEG respectively
$\vec{M}^{max}, \alpha^{max}$ - Maximum limit for tip speed and wind blade angle respectively
$C_j^*$ - contrast ratio

FIG. 8

ENERGY GENERATION CONTROLLER FOR WIND TURBINE WITH SHADOW-EFFECT ENERGY GENERATOR(S)

BACKGROUND

This disclosure relates generally to facilitating energy harvesting, and in particular, to enhancing energy generation from wind turbines with shadow-effect energy generators.

The energy sector accounts for a significant portion of total greenhouse gas emissions globally. Many countries are aligning their support towards clean energy, including wind energy generation and solar energy generation. With increasing focus on renewable, sustainable and clean energy, energy systems are expected to continue undergoing transformations to meet the growing demands for clean energy.

Today's wind turbines convert kinetic energy of wind into electrical energy. A variety of types of wind turbines exist, including horizontal-axis wind turbines, vertical axis wind turbines, Darrieus wind turbines, etc. In most embodiments, the wind turbines operate by using wind energy to turn blades that spin a generator, which creates electricity.

With solar energy generation, a solar array, or solar cell array, includes one or more solar cell panels, or photovoltaic panels, which are an assembly of photovoltaic solar cells that capture sunlight as a source of radiant energy and convert the radiant energy into electricity in the form of direct current (DC) electricity. Solar cells can be made of a variety of technologies. For instance, solar cells can be made of crystalline silicon wafers, or be based on thin-film silicon technologies. In other implementations, solar cells can be based on amorphous silicon. Other solar cell technologies are also possible in the art, including shadow-effect energy generation, which harnesses a contrast between light and shadow on the cells to generate electricity.

SUMMARY

Certain shortcomings of the prior art are overcome, and additional advantages are provided herein through the provision of a method which includes determining, by an energy generation controller, an adjustment to a blade angle of a wind turbine to increase cumulative energy generation over a forecast time interval from the wind turbine, where the wind turbine generates wind-based energy, and the wind turbine includes one or more shadow-effect energy generators to generate shadow-effect energy. The cumulative energy generation includes any wind-based energy generation and any shadow-effect energy generation over the forecast time interval. Further, the method includes initiating, by the energy generation controller, dynamically adjusting of the blade angle of the wind turbine using the determined adjustment to the blade angle to increase the cumulative energy generation over the forecast time interval from the wind turbine and the one or more shadow-effect energy generators.

Computer program products and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the disclosed inventive aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 8 depicts one example of a data-analysis-based control algorithm for optimizing cumulative energy generation over a forecast time interval from a wind turbine with one or more shadow-effect energy generators, in accordance with one or more aspects of the present disclosure.

DETAILED DESCRIPTION

Aspects of the present disclosure and certain features, advantages, and details thereof, are explained more fully below with reference to the non-limiting example(s) illustrated in the accompanying drawings. Descriptions of well-known software, systems, devices, processing techniques, tools, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, where the same or similar reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, tools, engines, etc. One or more aspects of an illustrative embodiment can be implemented in software, hardware, or a combination thereof.

Figure 1:
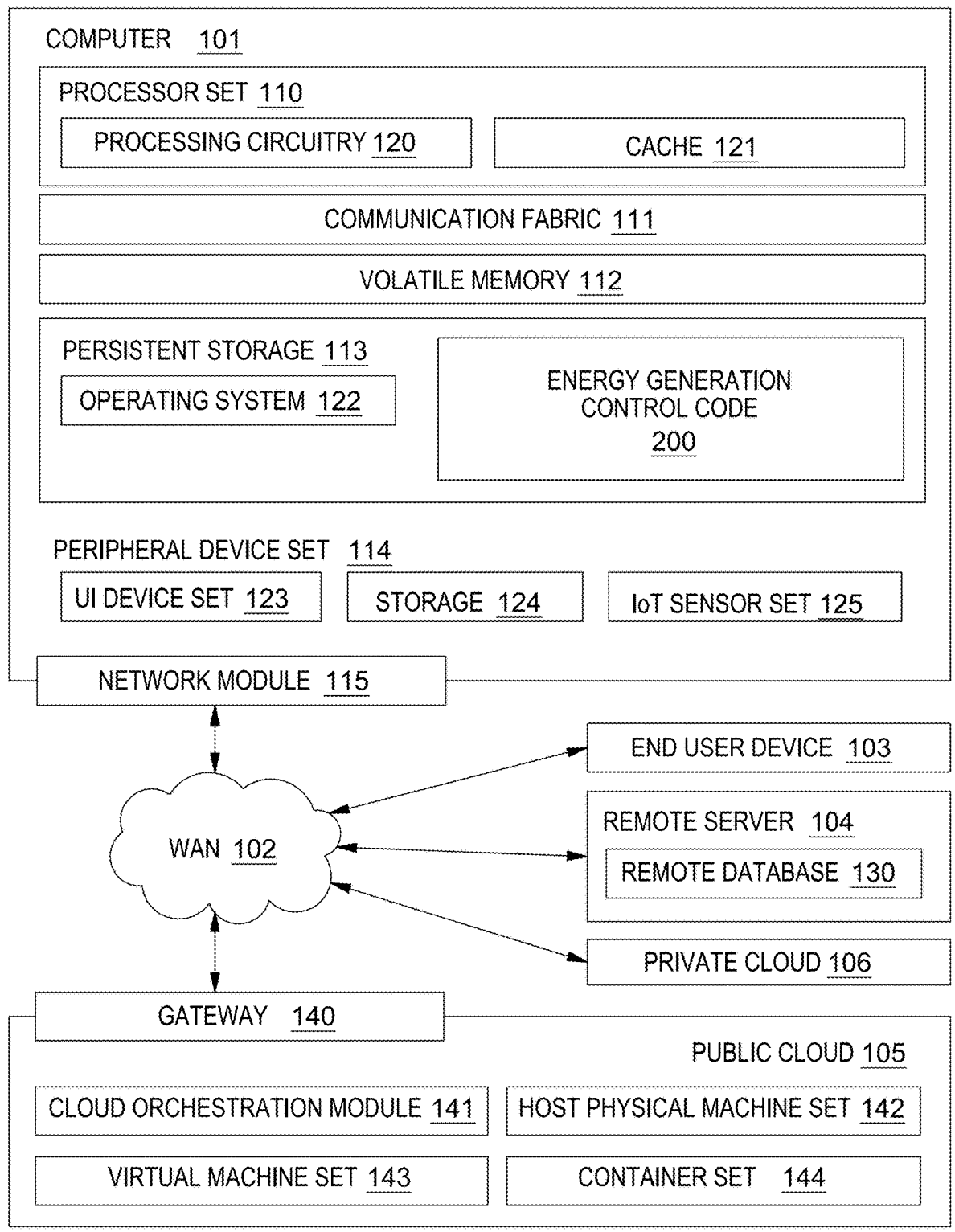
FIG. 1 depicts one example of a computing environment to include and/or use one or more aspects of the present disclosure.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs or code, are depicted in FIG. 1, including operating system 122 and energy generation control code 200, which are stored in persistent storage 113.

In one or more aspects disclosed herein, renewable energy systems and control processes are disclosed which utilize both wind turbine technology and shadow-effect energy generation technology to increase power density from a wind farm by combining or integrating one or more shadow-effect energy generators into the wind turbines. In one or more embodiments, the shadow-effect energy generator(s) are integrated or combined into one or more surface of the blades of the wind turbine, such as the spiral blades of a spiral blade wind turbine, as in the examples described further herein. Note that the spiral blade wind turbine is one example only of the renewable systems disclosed herein. In other embodiments, shadow-effect energy generators and energy generation control, such as disclosed herein, can be combined with other types of wind turbines, such as other horizontal-axis wind turbines or vertical-axis wind turbines, or other wind turbine designs.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one or more processor sets, each with one processor or multiple processors, and/or any other type of environment and/or configuration, etc., that is capable of executing a process (or multiple processes) that, e.g., perform processing, such as disclosed herein. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As illustrated in FIG. 1, computing environment 100 contains an example of an environment for the execution of at least some of the computer code involved in performing the inventive methods, such as energy generation control code 200. In addition to code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in data-analytics-based energy generation control code 200 includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2:
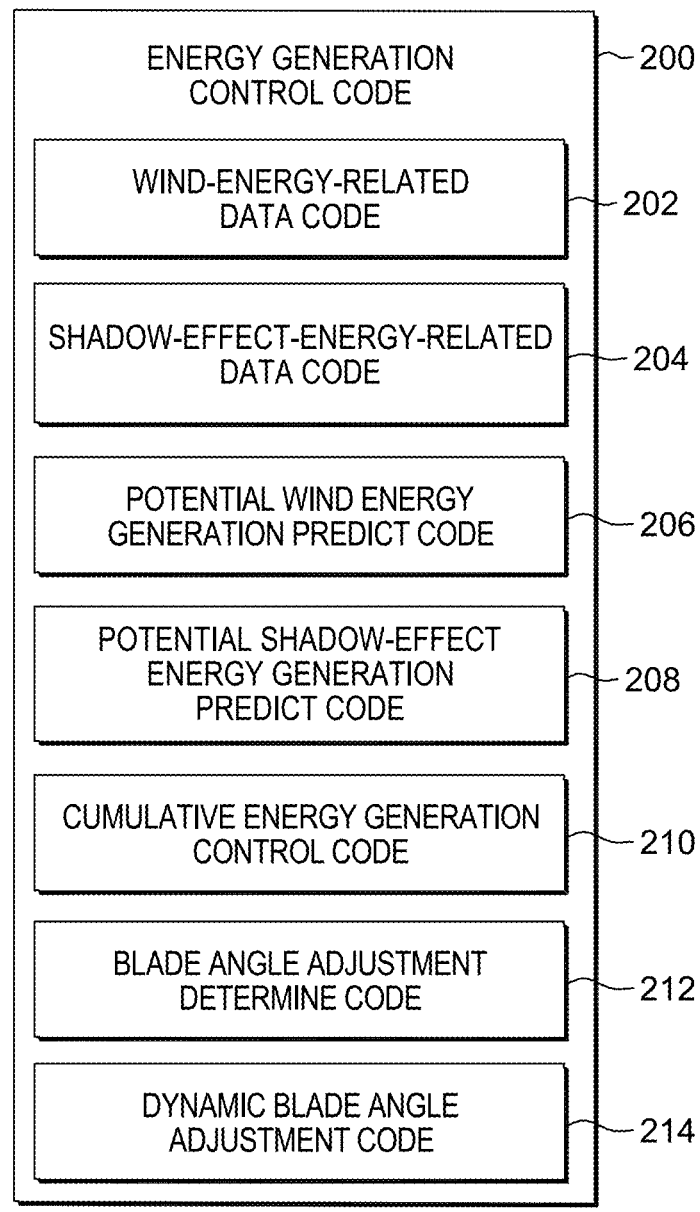
FIG. 2 depicts one embodiment of a computer program product with energy generation control code, in accordance with one or more aspects of the present disclosure.
Figure 3:
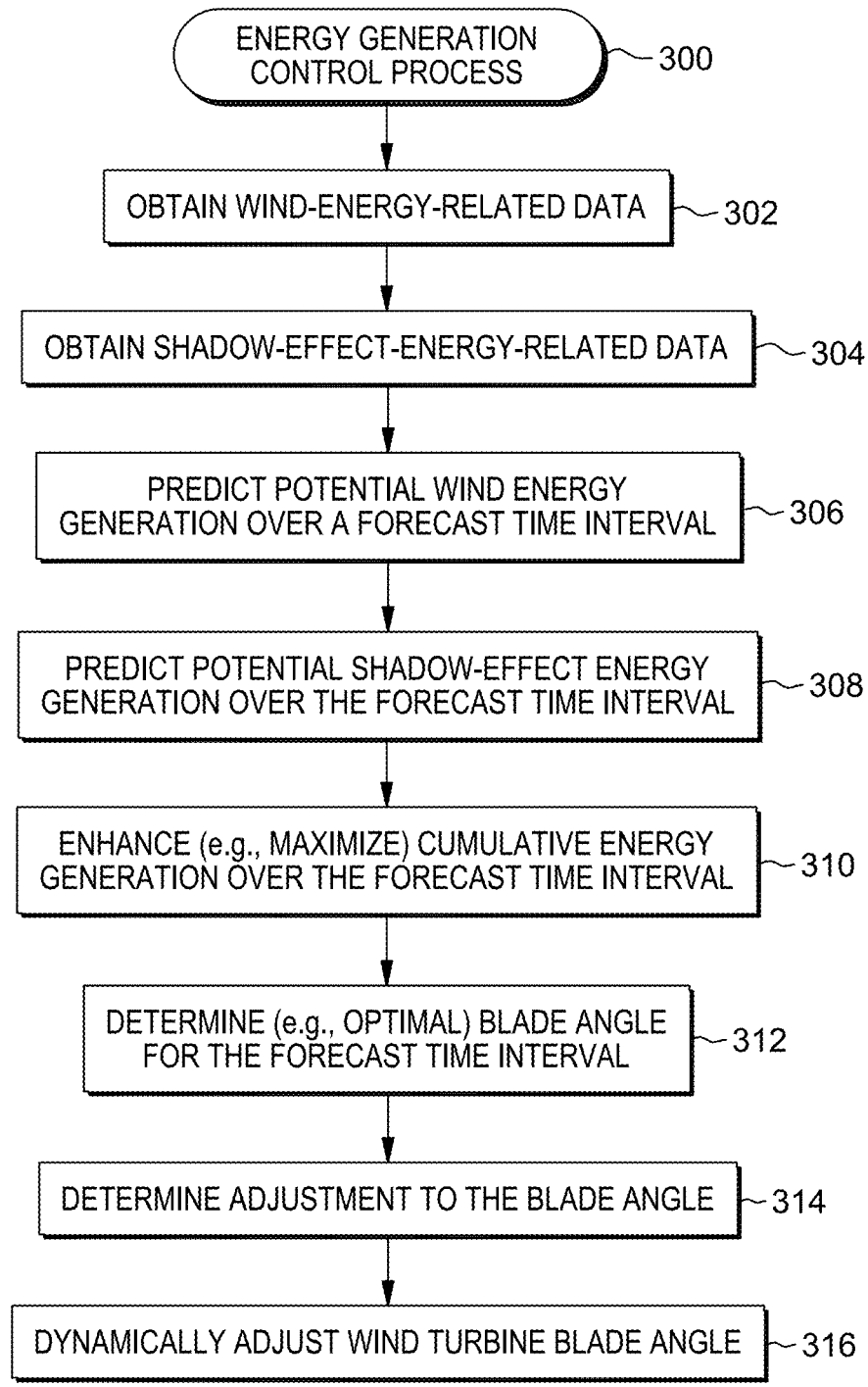
FIG. 3 depicts one embodiment of an energy generation control process, in accordance with one or more aspects of the present disclosure.

By way of example, one or more embodiments of an energy generation control code and workflow are described initially with reference to FIGS. 2-3. FIG. 2 depicts one embodiment of energy generation control code 200 that includes code or instructions to perform energy generation control, in accordance with one or more aspects of the present disclosure, and FIG. 3 depicts one embodiment of an energy generation control process, in accordance with one or more aspects of the present disclosure.

Referring to FIGS. 1-2, energy generation control code 200 includes, in one example, various code or sub-modules used to perform processing, in accordance with one or more aspects of the present disclosure. The sub-modules are, e.g., computer-readable program code (e.g., instructions) in computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101 (FIG. 1) and/or computing resource(s) 601 (FIG. 6); one or more processor sets 110 (FIG. 1); processors, such as one or more processors of processor set 110; and/or processing circuitry, such as processing circuitry of processor set 110, etc.

As noted, FIG. 2 depicts one embodiment of energy generation control code 200 which, when executing, implements energy generation control processing in accordance with one or more aspects of the present disclosure. In the embodiment of FIG. 2, example code of energy generation control code 200 includes wind-energy-related data code 202 to obtain wind-energy-related data from one or more data sources including, for instance, geolocation data, wind speed and wind direction data, forecasted wind speed and wind direction data, wind farm layout data, etc., and shadow-effect energy-related data code 204 to obtain shadow-effect-energy-related data from one or more data sources including, for instance, solar irradiance data, solar irradiance forecast data, time of day data, geolocation data, wind farm layout data, etc.

In one or more embodiments, energy generation control code 200 further includes potential wind energy generation predict code 206 to predict or estimate, via one or more machine learning models, potential wind energy generation for (for instance) one or more forecasted time instances of the forecast time interval, and potential shadow-effect energy generation predict code 208 to predict or estimate, via one or more machine learning models, potential shadow-effect energy generation for (for instance) the one or more forecasted time instances of the forecast time interval. In one or more embodiments, energy generation control code 200 further includes cumulative energy generation control code 210 to, for instance, increase cumulative energy generation over the forecast time interval from the wind turbine, where the wind turbine generates wind-based energy, and the wind turbine includes one or more shadow-effect energy generators to generate shadow-effect energy. In embodiments, energy generation control code 200 includes blade angle adjustment determine code 212 to determine an adjustment to a blade angle of the wind turbine to increase cumulative energy generation over the forecast time interval for the wind turbine and the one or more shadow-effect energy generators. In embodiments, energy generation control code 200 further includes dynamic blade angle adjustment code 214 to initiate, by the energy generation control (i.e., controller), dynamically adjusting of the blade angle of the wind turbine using the determined adjustment of the blade angle to increase the cumulative energy generation over the forecast time interval from the wind turbine and the one or more shadow-effect energy generators. In one or more embodiments, the energy generation controller is operatively coupled to the wind turbine, and in particular to an electromechanical blade angle adjustment mechanism of the wind turbine, to dynamically adjust the blade angle of the wind turbine using the determined adjustment to the blade angle.

Note also that although various code or sub-modules are described herein, an energy generation control code, such as disclosed, can use, or include, additional, fewer, and/or different code/sub-modules. A particular code can include additional code, including code of other sub-modules, or less code. Further, additional and/or fewer code/sub-modules can be used. Many variations are possible.

In one or more embodiments, the energy generation control code is used, in accordance with one or more aspects of the present disclosure, to perform energy generation control processing. FIG. 3 depicts one example of an energy generation control process 300, such as disclosed herein. The process is executed, in one or more embodiments, by a computer (e.g., computer 101 (FIG. 1), computing resource (s) 601 (FIG. 6)), and/or one or more processor sets, such as a processor or processing circuitry (e.g., of processor set 110 of FIG. 1). In one example, code or instructions implementing the process, are part of a code or module, such as energy generation control code 200 of FIGS. 1-2. In other examples, the code can be included in one or more other modules and/or one or more other sub-modules of one or more other modules. Various options are available.

As illustrated in FIG. 3, in one example, energy generation control process 300 executing on one or more computers (e.g., computer 101 of FIG. 1), one or more processor sets (e.g., processor set 110 of FIG. 1, such as a processor or processing circuitry of the processor set) performs energy generation control processing such as described herein, which includes, in one or more embodiments, obtaining wind-energy-related data 302, such as actual and forecasted wind speed and wind direction data, wind farm layout data, etc., to facilitate data-analysis-based predicting or estimating, via one or more machine learning models, potential wind energy generation for a forecast time interval, such as for one or more forecasted time instances of the forecast time interval, and obtaining shadow-effect-energy-related data 304, such as solar irradiance forecast data, weather forecast data, time-of-day data, etc., to facilitate data-analysis-based predicting or estimating, via one or more machine learning models, potential shadow-effect energy generation for the forecast time interval and/or for the one or more forecasted time instances of the forecast time interval.

In embodiments, energy generation control process 300 further includes predicting potential wind energy generation over the forecast time interval 306 and predicting potential shadow-effect energy generation over the forecast time interval 308. In one or more embodiments, predicting the potential energy generation and potential shadow-effect energy generation uses one or more machine learning models of an artificial intelligence-based energy generation controller (i.e., control). In embodiments, energy generation control process 300 includes enhancing or maximizing cumulative energy generation over the forecast time interval 310, where the cumulative energy generation over the forecast time interval includes the potential wind energy generation and the potential shadow-effect energy generation for the forecast time interval. For instance, where shadow-effect energy generation is minimal or not available, such as at nighttime, the adjustment to the blade angle of the wind turbine can be made to maximize potential wind energy generation over the forecast time interval, and where wind energy is forecasted to be minimal or insufficient to generate wind energy, the adjustment to the blade angle of the wind turbine can be determined to enhance the potential shadow-effect energy generation for the forecast time interval from the one or more shadow-effect energy generators associated with the wind turbine. In embodiments, energy generation control process 300 further includes determining a desired (e.g., optimal) blade angle for the forecast time interval 312 and from the desired blade angle, determining an adjustment to be made to the blade angle 314 from a current blade angle position of the wind turbine. Note that, that in one or more embodiments, the wind turbine is a horizontal-axis wind turbine and the wind turbine blade angle is rotatable horizontally to adjust the wind turbine with changes in wind direction, and is rotatable vertically to adjust orientation of one or more surfaces of the wind turbine (such as one or more blade surfaces of the wind turbine) relative to solar irradiance.

In embodiments, energy generation control process 300 further includes dynamically adjusting the wind turbine blade angle using the determined adjustment to the blade angle to increase the cumulative energy generation over the forecast time interval from the wind turbine and the one or more shadow-effect energy generators 316. In one example, dynamically adjusting the wind turbine blade angle is initiated by automatically sending, for instance, an indication or a control signal to a blade angle control mechanism of the wind turbine to dynamically adjust the blade angle of the wind turbine (e.g., horizontally and/or vertically) using the determined adjustment to, for instance, increase the cumulative energy generation over the forecast time interval from the wind turbine and the one or more shadow-effect energy generators. As an example, a control signal or other indication, can be sent by a computer (e.g., computer 101 (FIG. 1)), a processor of a processor set (e.g., processor set 110 (FIG. 1)), and/or processing circuitry of a processor set (e.g., processor set 110) (FIG. 1), or computing resource(s) 601 (e.g., running an artificial intelligence-based energy generation controller implementing energy generation control process 300) to an electronically controlled adjustment mechanism of the wind turbine that receives the indication and automatically adjusts of the wind turbine blade angle based on the determined adjustment for the forecast time interval.

Figure 4A:
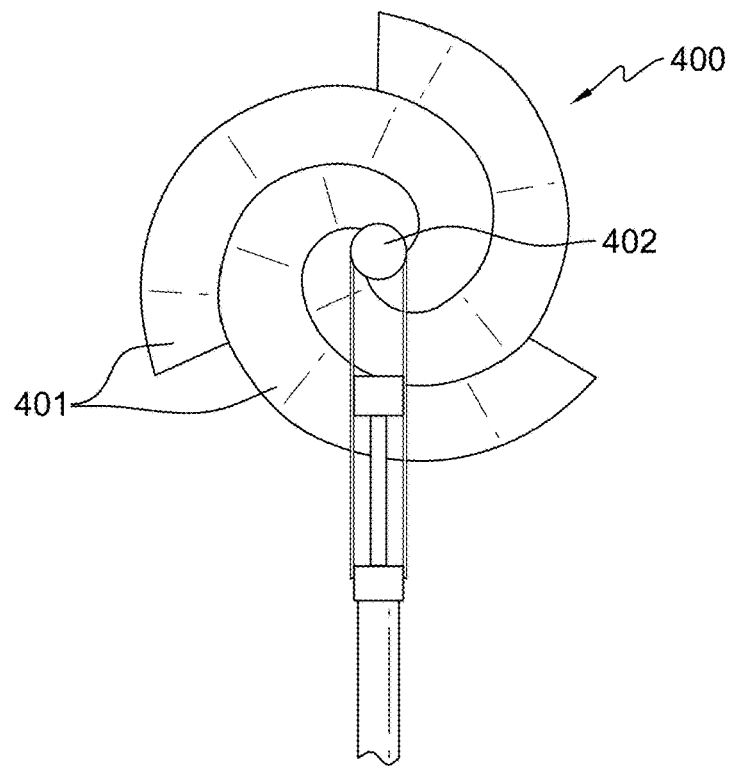
FIG. 4A is an elevational view of one embodiment of a wind turbine with one or more shadow-effect energy generators, to be controlled by an energy generation controller, in accordance with one or more aspects of the present disclosure.
Figure 4B:
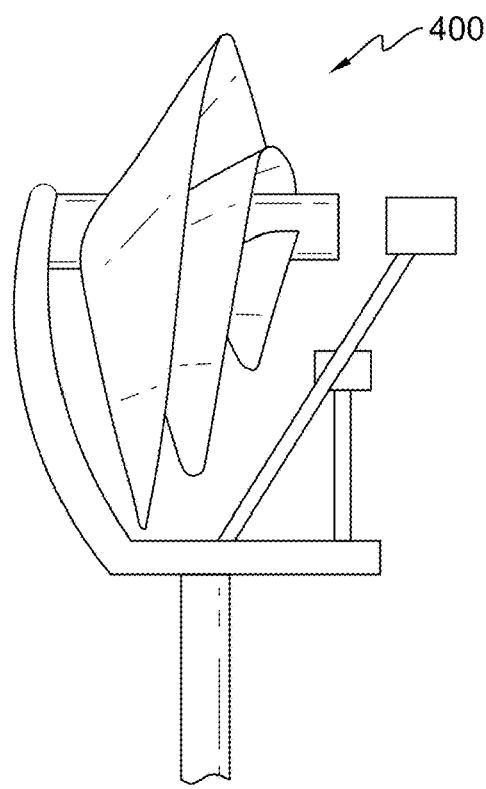
FIG. 4B is a side elevational depiction of the wind turbine embodiment of FIG. 4A, in accordance with one or more aspects of the present disclosure.

As noted, wind turbines operate by using wind energy to turn blades that spin a generator, which creates electricity. A variety of types of wind turbines exist, including horizontal-axis wind turbines (HAWT) and vertical axis wind turbines (VAWT). By way of example only, FIGS. 4A & 4B illustrate one embodiment of a horizontal-axis, spiral wind turbine (SWT) 400 or spiral blade wind turbine. Spiral wind turbine 400 has, for instance, three or more blades 401 that curve or spiral, at least in part, around a shaft 402. In one or more embodiments, blades 401 are symmetrically disposed around shaft 402, and are configured or designed to capture kinetic energy from the wind. Spiral blade wind turbine technology offers several advantages over traditional wind turbines, such as low land use requirements, low wind speed operability, and frequent change in wind direction operability.

Another source of renewable, sustainable and clean energy is solar-based technology, including shadow-effect energy generation via one or more shadow-effect energy generators, which use a contrast between brighter areas and shaded areas on a solar panel to create an electrical current. In embodiments, disclosed herein is a renewable energy system which utilizes both wind turbine technology and shadow-effect energy generation technology by combining or integrating one or more shadow-effect energy generators into the wind turbine, such as onto the blades of the wind turbine. In one embodiment, the one or more shadow-effect energy generators are integrated or embedded within one or more surfaces of the blades of the wind turbine, such as the spiral blades of a spiral blade wind turbine in the example of FIGS. 4A & 4B. Note that this is one example only of the renewable energy systems disclosed herein. In other embodiments, the one or more shadow-effect energy generators can be combined with other types of wind turbines such as other horizontal-axis wind turbines, or vertical-axis wind turbines, or other wind turbine designs.

Figure 5:
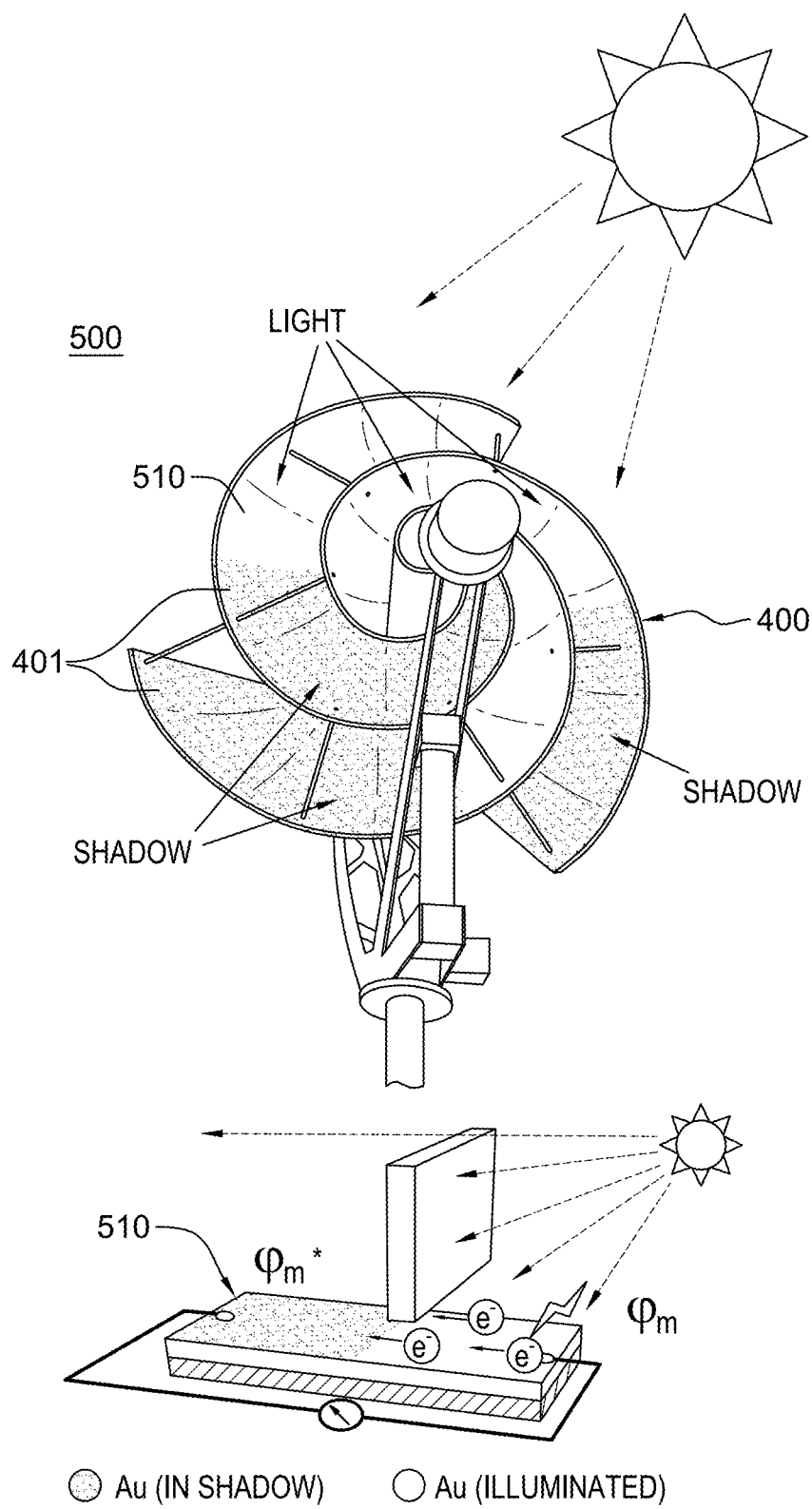
FIG. 5 is a schematic illustration of shadow-effect energy generation from a wind turbine with one or more shadow-effect energy generators, in accordance with one or more aspects of the present disclosure.

By way of example, FIG. 5 illustrates one embodiment of shadow-effect energy generation combined with a wind turbine, such as a spiral blade wind turbine, as part of a renewable energy system 500. In the example of FIG. 5, shadow-effect energy generators 510 are associated with (e.g., integrated within, secured to or otherwise part of) one or more surfaces of the wind turbine blades 401 of wind turbine 400. For instance, in one or more embodiments, the blades of the wind turbine can be made of shadow-effect energy generation material. Note also that, the shadow-effect energy generators 510 can be on one or both sides of one or more of the wind turbine blades 401. In this manner, the renewable energy system 500 of FIG. 5, including as one example, spiral blade wind turbine 400 with one or more shadow-effect energy generators 510, is configured to harvest energy from wind, light and shadow.

As noted, FIG. 5 illustrates one embodiment of renewable energy system 500, including one or more wind turbines 400 with one or more shadow-effect energy generators 510 on one or both surfaces of one or more blades 401 of wind turbine 400. As an example, the lower portion of FIG. 5 schematically illustrates shadow-effect energy generation via one or more shadow-effect energy generators 510, where a portion of the shadow-effect energy generator is illuminated by the sun, and another portion is shaded by a structure, such as one or more regions of the same blade or a different blade of the wind turbine, or another structure of the wind turbine, or an adjacent structure to the wind turbine. Within the shadow-effect energy generator, there is a wafer, such as a silicon wafer, with a conductive thin film, such as thin, or ultra-thin, gold, aluminum, tungsten, copper, etc., film (or coating). In one or more embodiments, the coating can be, for instance, only 15 nm thick. When solar irradiance encounters the silicon substrate, photons or light particles, free electrons, which create direct-current energy flow, for instance, from the illuminated portion of the energy generator to the shaded portion of the energy generator, as illustrated in FIG. 5. In practice, freed electrons move to the thin-film coating, and the metal's voltage increases when there is a difference between the light region and shaded region of the energy generator.

Generally stated, disclosed herein are methods, computer program products and computer systems for enhancing energy harvesting, and in particular, for enhancing energy harvesting from a renewable energy system which includes one or more wind turbines with one or more shadow-effect energy generators associated with the wind turbines, such as with one or more blades of a wind turbine. As a wind turbine blade rotates, the shadow-effect energy generator material will have bright and shadow profiles. By increasing, for instance, the frequency of the shadow and bright areas, the power generation per unit time can be increased. As wind direction and sun angle change, the angular position of the blade(s) can be changed by an energy generation controller such as disclosed herein, to increase (e.g., maximize) cumulative energy generation from wind and shadow-effect solar-energy generation for a particular time interval.

In embodiments, the process includes determining, by the energy generation controller (i.e., control), an adjustment to a blade of a wind turbine of a renewable energy system, such as disclosed herein. The adjustment to the blade angle of the wind turbine is to increase cumulative energy generation over a forecast time interval for the wind turbine. The wind turbine generates wind-based energy, and the wind turbine includes one or more shadow-effect energy generators to also generate shadow-effect energy. The cumulative energy generation includes any wind-based energy generation and any shadow-effect energy generation over the forecast time interval. Further, the method includes initiating, by the energy generation controller, dynamic adjusting of the blade angle of the wind turbine using the determined adjustment to the blade angle to increase the cumulative energy generation over the forecast time interval from the wind turbine and the one or more shadow-effect energy generators. In this manner, the renewable energy system can (by way of example only) advantageously generate shadow-effect energy, for instance, when there is little or no wind, and can generate wind energy, such as when there is no shadow and bright area contrast on one or more blades of the wind turbine, such as at night.

In embodiments, the method further includes data-analysis-based predicting, by the energy generation controller, a maximum cumulative energy generation over the forecast time interval from the wind turbine and the one or more shadow-effect energy generators based on multiple forecasting conditions for the forecast time interval. The adjustment to the blade angle of the wind turbine is determined based, at least in part, on the predicted maximum cumulative energy generation over the forecast time interval from the wind turbine and the one or more shadow-effect energy generators. In one or more embodiments, the data-analysis-based predicting, by the energy generation controller, of the maximum cumulative energy generation includes estimating, via one or more machine learning models, potential wind energy generation for one or more forecasted time instances of the forecast time interval, and potential shadow-effect energy generation for the one or more forecasted time instances of the forecast time interval.

In embodiments, estimating, via the one or more machine learning models, the potential wind energy generation includes determining the potential wind energy generation as a function of the blade angle and a blade tip speed, and the estimating, via the one or more machine learning models, the potential shadow-effect energy generation includes determining the potential shadow-effect energy generation as a function of the blade angle relative to a direction of solar irradiance and a shadow-to-light contrast ratio across an area of the one or more shadow-effect energy generators.

In one or more embodiments, the data-analysis-based predicting of the cumulative energy generation over the forecast time interval further includes subtracting from an estimated cumulative energy generation over the forecast time interval from the wind turbine and the one or more shadow-effect energy generators, an energy cost based on a size of the adjustment of the blade angle for the forecast time interval.

In one or more embodiments, the initiating, by the energy generation controller, dynamic adjustment of the blade angle of the wind turbine is based on determining that, with the adjustment, a predicted cumulative energy gain over the forecast time interval from the wind turbine and the one or more shadow-effect energy generators exceeds a specified threshold.

In one or more embodiments, the multiple forecasted conditions for the forecast time interval include a forecasted wind speed and wind direction for the wind turbine and a forecasted solar irradiance for the one or more solar-effect energy generators of the wind turbine.

In embodiments, the one or more shadow-effect energy generators include one or more shadow-effect energy generators associated with one or more blades of the wind turbine. In one or more embodiments, the renewable energy system generates energy from both the wind turbine and the shadow-effect energy generator(s) associated with the wind turbine concurrently and/or at different times of the day depending on, for instance, actual and/or forecasted conditions. In one or more embodiments, the one or more shadow-effect energy generators are one or more shadow-effect energy generators associated with (e.g., integrated or embedded within, secured to, etc.) one or more blades of the wind turbine. In one embodiment, the wind turbine is a spiral blade turbine, and the one or more shadow-effect energy generators are incorporated as part of one or more spiral blades of the spiral blade wind turbine.

In embodiments, the renewable energy systems disclosed herein use, for instance, a combination of geolocation, wind speed and direction forecast, solar irradiance forecast, time of day data and wind farm layout data to predict the wind energy and shadow-effect energy generation potential of a wind turbine for a forecast time interval. The renewable energy systems disclosed herein leverage, in one embodiment, spiral wind turbine blades made of a material capable of generating power from light and shadow (i.e., one or more shadow-effect energy generators (SEG)) to increase (e.g., maximize) cumulative energy generation from wind, light and shadow by dynamically operating the wind turbine blades at an optimal angle to the wind direction for wind energy generation and/or to solar irradiance for SEG energy generation for the forecast time interval. In embodiments, the energy generation controller disclosed herein implements a method to dynamically determine a blade angle of the wind turbine to increase the cumulative energy generation over a forecast time interval. In one embodiment, the energy generation controller dynamically determines an optimal blade angle of the wind turbine to maximize cumulative energy generation over the forecast time interval. As noted, in embodiments, one or more shadow-effect energy generators are associated with the blades of the wind turbine in order that additional energy can be harvested from the wind turbine. In embodiments, an aggregated energy gain from wind, light and shadow can be optimized or maximized for a forecast time interval considering the predicted wind energy potential generation and predicted shadow-effect energy potential generation, as well as the spiral blade angle, the wind turbine blade speed and any energy generation controller constraints desired for a particular implementation of the renewable energy system. For instance, in one or more embodiments, one or more blades of the wind turbine can be made of or embedded with shadow-effect energy generator material to capture shadow-effect energy along with capturing of wind-based energy from the wind turbine.

Figure 6:
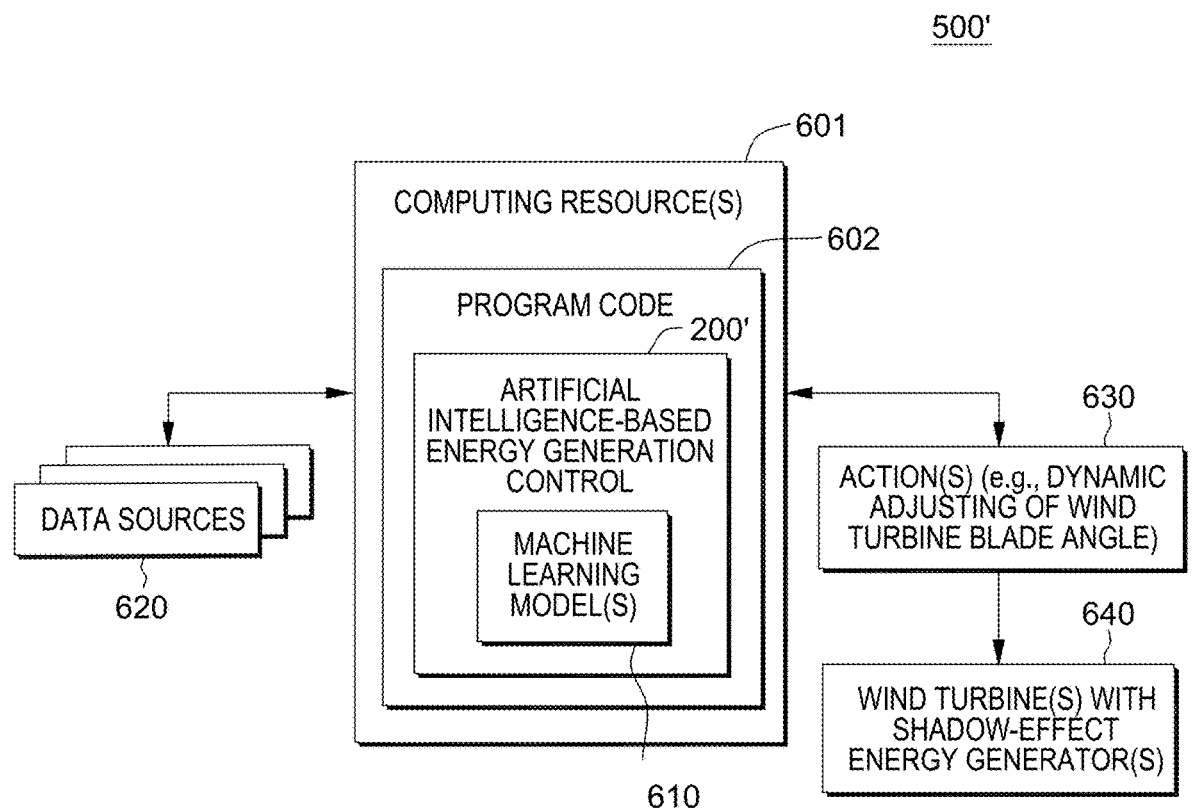
FIG. 6 is a further example of a renewable energy system to include and/or use one or more aspects of the present disclosure.

By way of further explanation, FIG. 6 depicts further details of one embodiment of a renewable energy system 500', which includes a computing environment or system that incorporates, or implements, one or more control aspects of an embodiment of the present disclosure. In one or more implementations, the computing system aspect is implemented as part of a computing environment, such as computing environment 100 described above in connection with FIG. 1. As illustrated, system 500' includes (or uses) one or more computing resources 601 that execute program code 602 that implements, for instance, one or more aspects of a facility such as disclosed herein, including an artificial-intelligence-based energy generation controller or control 200', such as energy generation control code 200 of FIGS. 1

& 2, which can utilize one or more machine learning models 610, such as described herein. Data, such as global positioning system (GPS) data for the renewable energy system, windspeed and direction forecast data, solar irradiance data, sun angle data, time of day data, renewable energy system layout data, structure data impacting solar irradiance on the one or more shadow-effect energy generators, and/or other data associated with generating one or more machine learning prediction models to be used in accordance with the present disclosure, is used by a cognitive engine or agent to train machine learning model(s) 610 to (for instance) predict wind energy generation potential and shadow-effect energy generation potential for a forecast time interval, as well as to maximize cumulative energy generation over the forecast time interval and to direct dynamic adjustment of a wind turbine(s) blade angle 630 in order to maximize cumulative energy generation over the forecast time interval from the wind turbine and one or more shadow-effect energy generators 640 of the renewable energy system 500'. In one or more embodiments, the particular blade angle adjustment and/or other action 630 taken by the energy generation controller is based on the particular application of the machine learning model(s).

In one implementation, system 500' can include, or utilize, one or more networks for interfacing various aspects of computing resource(s) 601, as well as one or more data sources 620 providing data, and one or more components, systems, etc., receiving an output, action, etc., 630 of machine learning model(s) 610 to facilitate performance of one or more artificial intelligence system operations. By way of example, the network(s) can be, for instance, a telecommunications network, a local-area network (LAN), a wide-area network (WAN), such as the Internet, or a combination thereof, and can include wired, wireless, fiber-optic connections, etc., operatively coupling the computing resource(s) 601 to the floating solar array and to other data sources. The network(s) can include one or more wired and/or wireless networks that are capable of receiving and transmitting data, including training data for the machine-learning model, and an output solution, recommendation, action, of the machine-learning model(s), such as discussed herein.

In one or more implementations, computing resource(s) 601 house and/or execute program code 602 configured to perform methods in accordance with one or more aspects of the present disclosure. By way of example, computing resource(s) 601 can be a computing-system-implemented resource(s). Further, for illustrative purposes only, computing resource(s) 601 in FIG. 6 is depicted as being a single computing resource. This is a non-limiting example of an implementation. In one or more other implementations, computing resource(s) 601 can, at least in part, be multiple separate computing resources or systems, such as one or more computing resources of a cloud-hosting environment, by way of example only.

Briefly described, in one embodiment, computing resource(s) 601 can include one or more processors, for instance, central processing units (CPUs). Also, the processor(s) can include functional components used in the integration of program code, such as functional components to fetch program code from locations such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system (s) which can implement one or more aspects disclosed are described further herein with reference to the figures.

In one embodiment, program code 602 includes artificial intelligence-based energy generation controller 200', which utilizes or includes (and optionally trains) one or more models 610. The models can be trained using training data that can include a variety of types of data, depending on the model and the data sources. In one or more embodiments, program code 602 executing on one or more computing resources 601 applies one or more algorithms of energy generation controller 200' to generate and train the model(s), which the program code then utilizes to, for instance, predict wind energy generation potential and shadow-effect energy generation potential over a forecast time interval, and to direct or initiate dynamic adjustment of one or more wind turbine(s) blade angle of the renewable energy system 500' at the wind turbine(s) with shadow-effect energy generator (s) 640, based on the particular application of the machine learning model(s). In an initialization or learning stage, program code 602 trains one or more machine learning models 610 using obtained training data that can include, in one or more embodiments, one or more data source inputs, including wind turbine data, weather forecast data (including wind direction and speed), shadow-effect energy generator data, solar irradiance data, satellite imagery data, GPS data, time of day data, data on structures within or near the wind turbine farm effecting wind and/or solar irradiance on the farm, etc., such as described herein.

Data used to train the models, in one or more embodiments of the present disclosure, can include a variety of types of data, such as heterogeneous data generated by multiple data sources and/or data stored in one or more databases accessible by, the computing resource(s). Program code, in embodiments of the present disclosure, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 610, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present disclosure, the program code can utilize one or more neural networks to analyze training data and/or collected data to generate an operational machine-learning model 610. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex datasets, neural networks and deep learning provide solutions to many problems in multi-source processing, which program code, in embodiments of the present disclosure, can utilize in implementing a machine-learning model, such as described herein.

Figure 7:
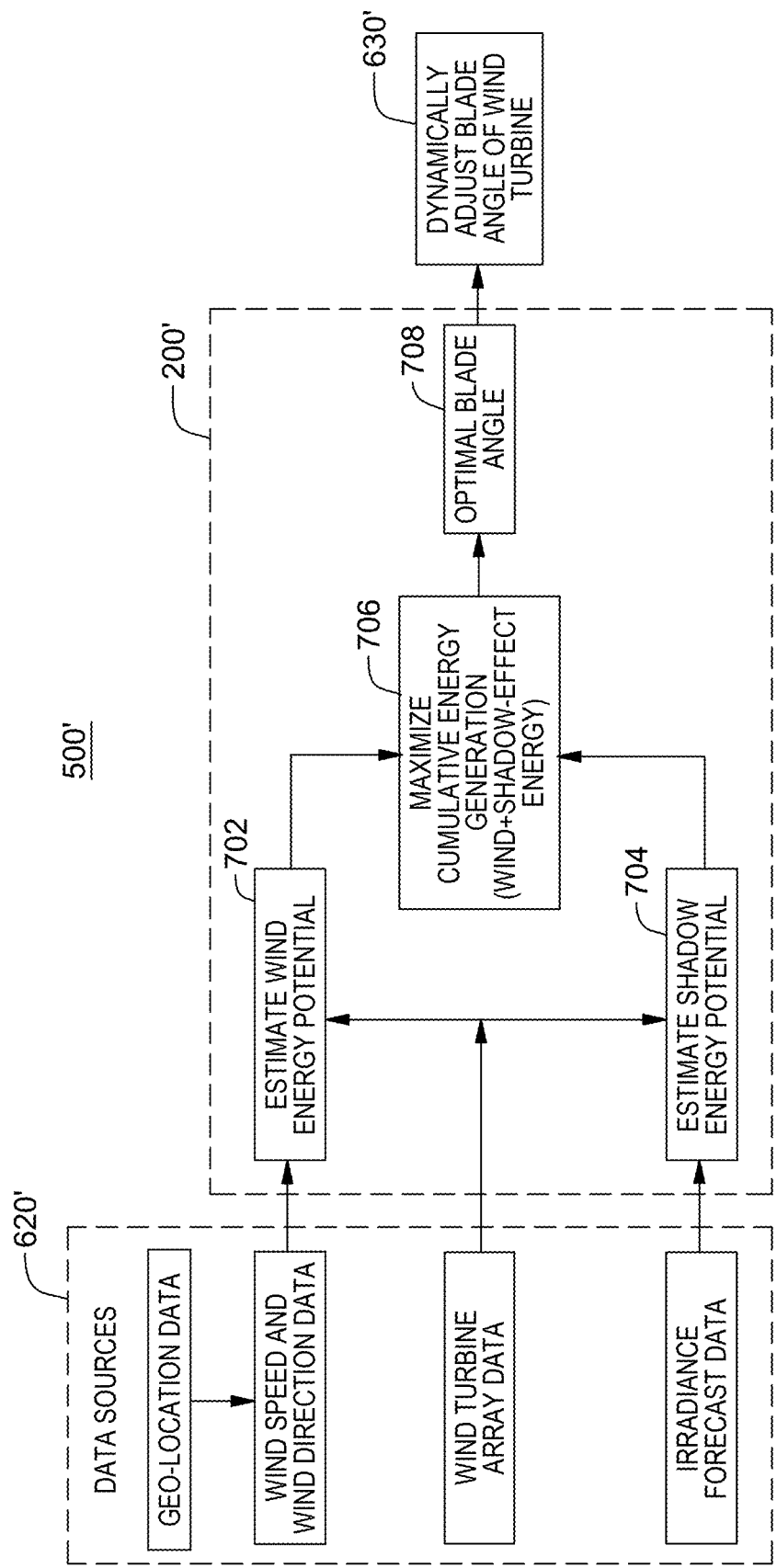
FIG. 7 depicts one embodiment of an energy generation optimization control process, in accordance with one or more aspects of the present disclosure.

FIG. 7 depicts one embodiment of an energy generation control process and FIG. 8 depicts one example of a data-analysis-based control algorithm for maximizing cumulative energy generation, in accordance with one or more aspects of the present disclosure. The energy generation control process of FIG. 7 is implemented, by way of example, by a renewable energy system 500' such as described above in connection with FIGS. 1-6. As illustrated, one or more data sources 620' provide data for energy generation controller 200' to facilitate energy generation optimization. In the embodiment depicted, the data sources provide, by way of example, geolocation data for the particular wind farm, or particular wind turbine, location data, as well as wind speed data and wind direction data, such as forecasted wind speed data and forecasted wind direction data. Additional data provided to the energy generation controller 200' can include, for instance, wind turbine array data, as well as irradiance forecast data, time-of-day data, etc., as desired to facilitate estimating wind energy potential 702 and estimating shadow-effect energy potential 704 for a forecast time interval, such as disclosed herein. Note that the forecast time interval can be any of a variety of time-based intervals including, for instance, a seconds-based interval, minutes-based interval and/or hours-based interval, depending on the implementation. Also, note that as understood by one skilled in the art, the higher the brightness of solar irradiance in the illumination area of the shadow-effect energy generator, the greater the energy potential generation from the SEG material. In addition to irradiance level data, contrast profiles of the shadow and illumination areas can be used to estimate the shadow energy potential. From the estimated potentials, the energy generation controller 200' can predict a maximum cumulative energy generation over the forecast time interval from the wind turbine and from the one or more shadow-effect energy generators using the multiple data inputs, such as the forecasted condition data for the time interval. From the maximum cumulative energy generation potential 706, an optimal blade angle 708 is determined by the energy generation controller 200' and then used to dynamically adjust the blade angle of the wind turbine 630'.

As noted, FIG. 8 depicts one example of a data-analysis-based control algorithm for optimizing cumulative energy generation over a forecast time interval from a wind turbine with one or more shadow-effect energy generators, in accordance with one or more aspects of the present disclosure. As illustrated, the wind blade angle ($\alpha_j^*$) is chosen such that it is optimal for the next 'N' forecasted time instances of a forecast time interval. For instance, at each step or instance, the blade angle is chosen to maximize wind energy generation of the wind blades, and to maximize shadow-effect energy generation of the SEG material embedded in the wind blades by adjusting (e.g., increasing) the shadow-to-illumination contrast ratio ($C_j^*$). In the example of FIG. 8, the maximum energy generation for the forecast time interval includes the summation of potential energy generated by the wind turbine over one or more forecasted time instances, and potential energy generated by the SEG material embedded in the wind blades for the one or more forecasted time instances of the forecast time interval, as well as an offset provided as an energy subtraction for large changes in wind turbine blade angle. Note that the offset is an energy cost based on the size of adjustment of a blade angle from a current angle to, for instance, the determined blade angle. In the data-analysis-based control algorithm example of FIG. 8, weighing coefficients for each of the different factors can be provided in order to, for instance, give greater weight to wind energy generation, shadow-effect energy generation, and/or the cost offset for large changes in blade angle, as desired for a particular application.

Figure 9:
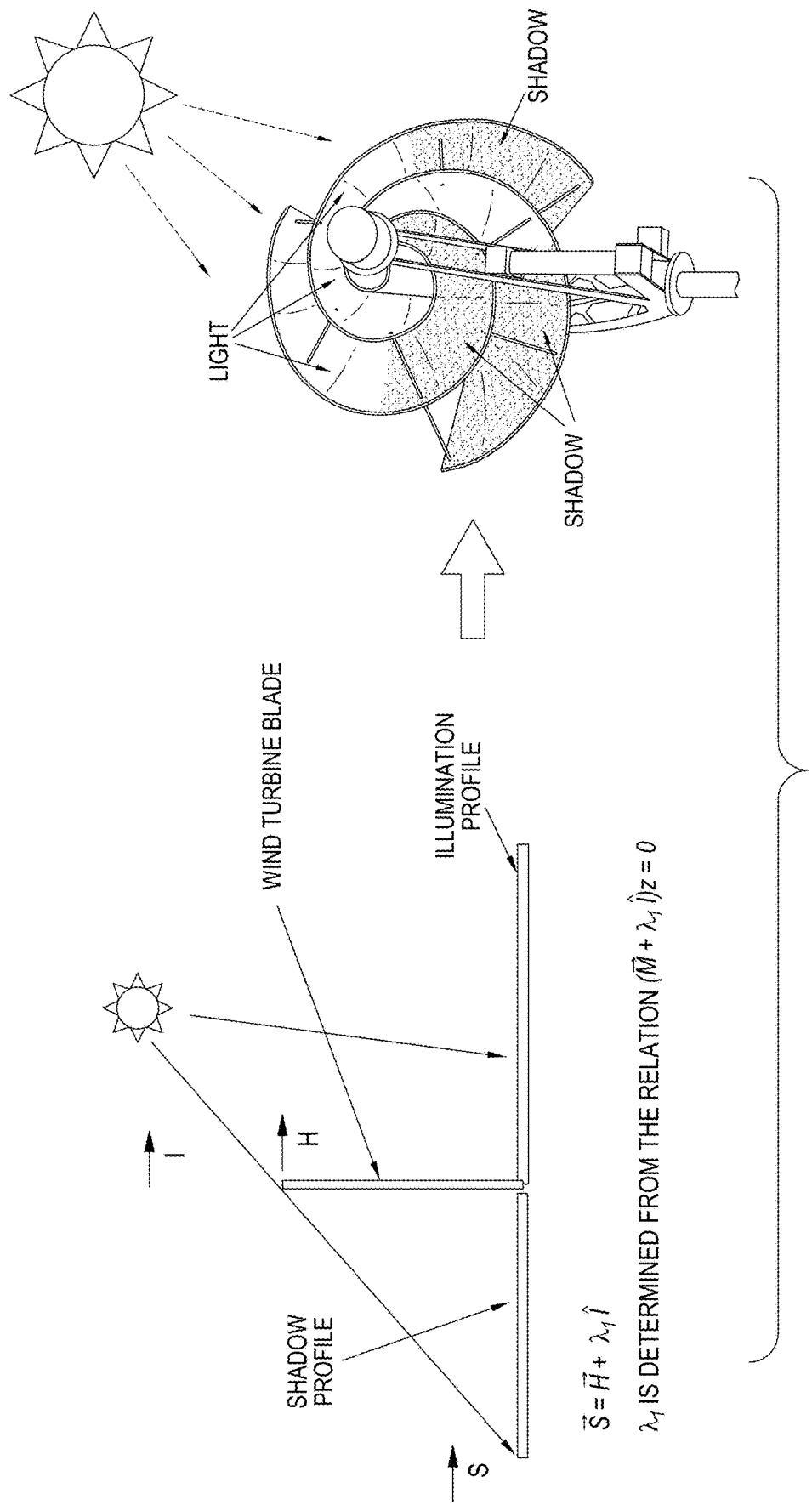
FIG. 9 is a schematic illustrating combined wind turbine and shadow-effect energy generation, in accordance with one or more aspects of the present disclosure.

By way of further example, FIG. 9 is a schematic illustrating combined wind turbine and shadow-effect energy generation, in accordance with one or more aspects of present disclosure. As illustrated, the shadow profile (S) of any structure (H) is obtained by extending the incident vector (I) and finding the coordinates where it touches the blades in which the shadow-effect energy generators are embedded. In one or more embodiments, each wind turbine blade of a wind turbine can have shadow-effect energy generators embedded in at least one surface of the blade, as discussed herein. The schematic illustrates that one portion of a wind turbine blade can cause a shadow profile on the same wind turbine blade or another wind turbine blade depending, for instance, on the orientation of the wind turbine and blade angle relative to the sun. As noted, the ratio of the shadow profile and the illumination profile provides the contrast ratio, and the contrast ratio is directly proportional to the power generation for the given shadow-effect energy generator characteristics.

In general, disclosed herein are wind turbines, such as spiral wind turbines, where one or more blades of the wind turbines are made of or include shadow-effect energy generator material or cells, so that the wind turbine surface will also generate shadow-effect energy, along with the wind turbine harvesting wind energy, to enhance power output of the renewable energy system. In one or more embodiments, the renewable energy system can include a wind farm including an array of wind turbines which include shadow-effect energy generators on one or more blade surfaces of the wind turbines. In one or more embodiments, the spiral surface of a spiral wind turbine, creates additional sun and shadow exposure for shadow-effect power generation. In such an implementation, the vertical position or angle orientation of the wind turbine blades can be adjusted to increase the solar exposure surface area of the blades as needed to generate additional SEG power. In one or more embodiments, the vertical profile of the spiral wind turbine blade(s) is created in such a way that the shadow of any vertical position of the blade creates a shadow onto a lower position of the spiral blade, so that additional shadow power can be generated. Based on changes in conditions, the renewable energy systems disclosed herein identify how the aggregated potential energy generation can be maximized. In one or more embodiments, the wind turbine with the shadow-effect energy generators is dynamically auto-aligned to the wind direction and/or sun location to maximize the aggregated or cumulative power generation potential from the wind turbine for a forecast time interval. Based on forecasted conditions, such as weather conditions (e.g., cloudy, sunny), the energy generation controller (i.e., control) determines how best to align the wind turbine so that the power generation potential for the upcoming forecast time interval will be maximized.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer-readable code into a computing system, in which the code in combination with the computing system is capable of performing one or more embodiments.

Yet a further aspect, a process for integrating computing infrastructure comprising integrating computer-readable code into a computer system may be provided. The computer system comprises a computer-readable medium, in which the computer medium comprises one or more embodiments. The code in combination with the computer system is capable of performing one or more embodiments.

Although various embodiments are described above, these are only examples. For example, other models and/or weather data may be used. Moreover, additional, less and/or other code may be used. Although particular code may be provided as an example of performing a particular operation or task, additional and/or other code may be used. Code may be combined and/or separated into code subsets. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
   determining, by an energy generation controller, an adjustment to a blade angle of a wind turbine to increase cumulative energy generation over a forecast time interval from the wind turbine, where the wind turbine generates wind-based energy, and the wind turbine includes one or more shadow-effect energy generators to generate shadow-effect energy, the cumulative energy generation including at least shadow-effect energy generation within the forecast time interval; and
   initiating, by the energy generation controller, dynamically adjusting of the blade angle of the wind turbine using the determined adjustment to the blade angle to increase the cumulative energy generation over the forecast time interval from the wind turbine and the one or more shadow-effect energy generators.

2. The method of claim 1, further comprising data-analysis-based predicting, by the energy generation controller, a maximum cumulative energy generation over the forecast time interval from the wind turbine and the one or more shadow-effect energy generators based on multiple forecasted conditions for the forecast time interval, wherein the adjustment to the blade angle of the wind turbine is determined based, at least in part, on the predicted maximum cumulative energy generation over the forecast time interval from the wind turbine and the one or more shadow-effect energy generators.

3. The method of claim 2, wherein the data-analysis-based predicting, by the energy generation controller, of the maximum cumulative energy generation comprises estimating, via one or more machine learning models, potential wind energy generation for one or more forecasted time instances of the forecast time interval, and potential shadow-effect energy generation for the one or more forecasted time instances of the forecast time interval.

4. The method of claim 3, wherein the estimating, via the one or more machine learning models, the potential wind energy generation includes determining the potential wind energy generation as a function of the blade angle and a blade tip speed, and the estimating, via the one or more machine learning models, the potential shadow-effect energy generation includes determining the potential shadow-effect energy generation as a function of the blade angle relative to a direction of solar irradiance and a shadow-to-illumination contrast ratio across an area of the one or more shadow-effect energy generators.

5. The method of claim 3, wherein the data-analysis-based predicting of the maximum cumulative energy generation over the forecast time interval further comprises subtracting from an estimated cumulative energy generation over the forecast time interval from the wind turbine and the one or more shadow-effect energy generators an energy cost based on a size of adjustment of the blade angle for the forecast time interval.

6. The method of claim 3, wherein the initiating, by the energy generation controller, the dynamic adjustment of the blade angle of the wind turbine is based on determining that, with the adjustment, a predicted cumulative energy gain over the forecast time interval from the wind turbine and the one or more shadow-effect energy generators exceeds a specified threshold.

7. The method of claim 2, wherein the multiple forecasted conditions for the forecast time interval comprises a forecasted wind speed and wind direction for the wind turbine and a forecasted solar irradiance for the one or more shadow-effect energy generators of the wind turbine.

8. The method of claim 1, wherein the one or more shadow-effect energy generators comprise one or more shadow-effect energy generators associated with one or more blades of the wind turbine.

9. The method of claim 8, wherein the wind turbine is a spiral blade wind turbine, and the one or more shadow-effect energy generators are incorporated as part of one or more blades of the spiral blade wind turbine.

10. A computer program product comprising:
one or more computer-readable storage media; and
program instructions stored on the one or more computer-readable storage media to perform operations comprising:

determining, by an energy generation controller, an adjustment to a blade angle of a wind turbine to increase cumulative energy generation over a forecast time interval from the wind turbine, where the wind turbine generates wind-based energy, and the wind turbine includes one or more shadow-effect energy generators to generate shadow-effect energy, the cumulative energy generation including at least shadow-effect energy generation within the forecast time interval; and
initiating, by the energy generation controller, dynamically adjusting of the blade angle of the wind turbine using the determined adjustment to the blade angle to increase the cumulative energy generation over the forecast time interval from the wind turbine and the one or more shadow-effect energy generators.

11. The computer program product of claim 10, wherein the operations further comprise data-analysis-based predicting, by the energy generation controller, a maximum cumulative energy generation over the forecast time interval from the wind turbine and the one or more shadow-effect energy generators based on multiple forecasted conditions for the forecast time interval, wherein the adjustment to the blade angle of the wind turbine is determined based, at least in part, on the predicted maximum cumulative energy generation over the forecast time interval from the wind turbine and the one or more shadow-effect energy generators.

12. The computer program product of claim 11, wherein the data-analysis-based predicting, by the energy generation controller, of the maximum cumulative energy generation comprises estimating, via one or more machine learning models, potential wind energy generation for one or more forecasted time instances of the forecast time interval, and potential shadow-effect energy generation for the one or more forecasted time instances of the forecast time interval.

13. The computer program product of claim 12, wherein the estimating, via the one or more machine learning models, the potential wind energy generation includes determining the potential wind energy generation as a function of the blade angle and a blade tip speed, and the estimating, via the one or more machine learning models, the potential shadow-effect energy generation includes determining the potential shadow-effect energy generation as a function of the blade angle relative to a direction of solar irradiance and a shadow-to-illumination contrast ratio across an area of the one or more shadow-effect energy generators.

14. The computer program product of claim 12, wherein the data-analysis-based predicting of the maximum cumulative energy generation over the forecast time interval further comprises subtracting from an estimated cumulative energy generation over the forecast time interval from the wind turbine and the one or more shadow-effect energy generators an energy cost based on a size of adjustment of the blade angle for the forecast time interval.

15. The computer program product of claim 12, wherein the initiating, by the energy generation controller, the dynamic adjustment of the blade angle of the wind turbine is based on determining that, with the adjustment, a predicted cumulative energy gain over the forecast time interval from the wind turbine and the one or more shadow-effect energy generators exceeds a specified threshold.

16. The computer program product of claim 11, wherein the multiple forecasted conditions for the forecast time interval comprises a forecasted wind speed and wind direction for the wind turbine and a forecasted solar irradiance for the one or more shadow-effect energy generators of the wind turbine.

17. A computer system comprising:
a processor set;
one or more computer-readable storage media; and
program instructions stored on the one or more computer-readable storage media to cause the processor set to perform operations comprising:
  determining, by an energy generation controller, an adjustment to a blade angle of a wind turbine to increase cumulative energy generation over a forecast time interval from the wind turbine, where the wind turbine generates wind-based energy, and the wind turbine includes one or more shadow-effect energy generators to generate shadow-effect energy, the cumulative energy generation including at least shadow-effect energy generation within the forecast time interval; and
  initiating, by the energy generation controller, dynamically adjusting of the blade angle of the wind turbine using the determined adjustment to the blade angle to increase the cumulative energy generation over the forecast time interval from the wind turbine and the one or more shadow-effect energy generators.

18. The computer system of claim 17, wherein the operations further comprise data-analysis-based predicting, by the energy generation controller, a maximum cumulative energy generation over the forecast time interval from the wind turbine and the one or more shadow-effect energy generators based on multiple forecasted conditions for the forecast time interval, wherein the adjustment to the blade angle of the wind turbine is determined based, at least in part, on the predicted maximum cumulative energy generation over the forecast time interval from the wind turbine and the one or more shadow-effect energy generators.

19. The computer system of claim 18, wherein the data-analysis-based predicting, by the energy generation controller, of the maximum cumulative energy generation comprises estimating, via one or more machine learning models, potential wind energy generation for one or more forecasted time instances of the forecast time interval, and potential shadow-effect energy generation for the one or more forecasted time instances of the forecast time interval.

20. The computer system of claim 19, wherein the estimating, via the one or more machine learning models, the potential wind energy generation includes determining the potential wind energy generation as a function of the blade angle and a blade tip speed, and the estimating, via the one or more machine learning models, the potential shadow-effect energy generation includes determining the potential shadow-effect energy generation as a function of the blade angle relative to a direction of solar irradiance and a shadow-to-illumination contrast ratio across an area of the one or more shadow-effect energy generators.

* * * * *